C. W. SMALL.
PROTECTIVE MAT FOR USE WITH AUTOMOBILES.
APPLICATION FILED JAN. 22, 1916.

1,202,441.

Patented Oct. 24, 1916.

WITNESSES:

INVENTOR.
Charles W. Small.
BY Frank H. Allen
Frederick K. Daggett.
ATTORNEYS.

UNITED STATES PATENT OFFICE.

CHARLES W. SMALL, OF MALDEN, MASSACHUSETTS.

PROTECTIVE MAT FOR USE WITH AUTOMOBILES.

1,202,441.

Specification of Letters Patent.

Patented Oct. 24, 1916.

Application filed January 22, 1916. Serial No. 73,753.

*To all whom it may concern:*

Be it known that I, CHARLES W. SMALL, a citizen of the United States, residing at Malden, in the county of Middlesex, in the State of Massachusetts, have invented a certain new and useful Improvement in Protective Mats for Use with Automobiles, of which the following is a specification, reference being had to the accompanying drawings.

My improved mat is specially designed for use with automobiles which are open to the weather below the flooring; that is to say in which no protection is ordinarily made against the passage of cold air upward through the floor openings in which the various levers operate.

The immediate purpose of my present invention is to provide at a reasonable cost a mat which may be quickly and conveniently located on the flooring of such cars, which mat will embody in its construction what I term "air breaks" which project upward around the several levers, said air breaks being made of flexible material, and including means for securing them to their respective levers so that the levers may be operated as freely as if the air breaks were not provided, yet the cold air will be effectually prevented from passing upward through the floor openings to chill the feet of the chauffeur or of others who may be riding in the car.

Figure 1:
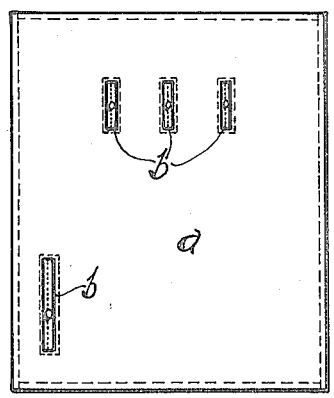
Figure 2:
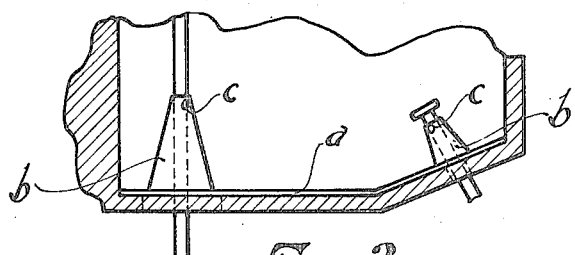
Figure 3:
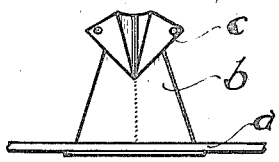
Figure 4:
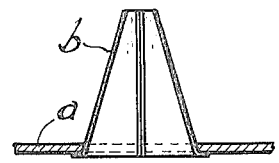

My invention is illustrated in the annexed drawings, Figure 1 being a plan view of a protective mat embodying my present improvement. Fig. 2 is a vertical, sectional, view of a portion of the flooring of an automobile showing my said mat mounted thereon. In Figs. 3 and 4 I have shown, relatively enlarged, one of the flexible tubular extensions which form an important feature of novelty in my invention; the said extension being illustrated opened in Fig. 3 and closed in Fig. 4.

Briefly described my improvement consists of a mat of rubber, or of any other suitable material, said mat being constructed with tubular, flexible, extensions (one for each lever) each extension being provided at or near its end portion with buttons, snaps, or other forms of fastenings, whereby each extension can be readily secured tightly around its particular lever, so to prevent the cold air from passing upward around the lever.

Referring now to the drawings the letter $a$ indicates a mat of suitable size and shape to be laid upon the floor of an automobile, under the feet of the driver of the car; said mat being slitted at points registering with the floor openings through which the "brake control", "emergency", "reverse", and other levers project and at each one of said slitted points I secure, preferably, to the upper side of the mat, by stitching, cementing, or otherwise, a tube-like flexible casing $b$ which extends upward, around the lever, as seen in Fig. 2 of the drawings, the upper end portion of said casing being then wrapped tightly around the lever and fastened by means of a snap or button $c$. I thus provide, in effect, an air-tight flexible tube around each lever, which prevents the cold air from passing upward through the floor opening into the space occupied by the chauffeur but which in no way or degree interferes with the free operation of the said lever.

While I have particularly described the extensions of my protective mat as projecting upward around the levers, it will be obvious that the said extensions could, in some instances, be tucked down through the floor openings and secured to the levers below the floor.

My described device may be very cheaply produced; it may be quickly placed in its operative position in a car without cutting or altering the flooring, and I find that it adds materially to the comfort of those who ride in a car thus equipped with said "air break", as it excludes heat and dust in summer as well as cold in winter.

Having thus described my invention, I claim as new and wish to secure by Letters Patent:—

As an article of manufacture for automobiles and the like a mat of flexible material, said mat being provided with openings for receiving the automobile-controlling levers, and with conical extensions around said openings and in continuation of said mat, said conical extensions being split in their tapering terminals, the resultant flaps thereof being provided with means for clasping the flaps in position around said levers.

CHARLES W. SMALL.